United States Patent
Kwon et al.

(10) Patent No.: US 10,879,547 B2
(45) Date of Patent: Dec. 29, 2020

(54) CONTROL METHOD AND CONTROL SYSTEM OF HYDROGEN CONCENTRATION FOR FUEL CELL

(71) Applicants: Hyundai Motor Company, Seoul (KR); Kia Motors Corporation, Seoul (KR)

(72) Inventors: Soon Woo Kwon, Gyeonggi-do (KR); Hyeon Seok Ban, Gyeonggi-do (KR); Joon Yong Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 197 days.

(21) Appl. No.: 16/055,454

(22) Filed: Aug. 6, 2018

(65) Prior Publication Data

US 2019/0288314 A1    Sep. 19, 2019

(30) Foreign Application Priority Data

Mar. 14, 2018 (KR) .................. 10-2018-0029616

(51) Int. Cl.
*H01M 8/04791* (2016.01)
*H01M 8/22* (2006.01)
*H01M 8/04746* (2016.01)

(52) U.S. Cl.
CPC ... *H01M 8/04798* (2013.01); *H01M 8/04753* (2013.01); *H01M 8/222* (2013.01)

(58) Field of Classification Search
None
See application file for complete search history.

(56) References Cited

U.S. PATENT DOCUMENTS

| 8,195,407 B2* | 6/2012 | Salvador | H01M 8/04223 702/24 |
| 2013/0137007 A1* | 5/2013 | Lee | H01M 8/04447 429/444 |
| 2017/0084941 A1* | 3/2017 | Cai | H01M 8/04305 |

FOREIGN PATENT DOCUMENTS

| JP | 2004-185974 A | 7/2004 |
| JP | 2006-221980 A | 8/2006 |
| JP | 2006-324058 A | 11/2006 |
| JP | 2008-047518 A | 2/2008 |
| JP | 2009-059556 A | 3/2009 |
| JP | 5502553 B2 | 5/2014 |
| KR | 10-1459815 B1 | 11/2014 |

OTHER PUBLICATIONS

Non-Final Office Action dated May 1, 2020 in U.S. Appl. No. 16/055,391.
Cha, S. (2016), Fuel Cell Fundamentals (3rd ed.) (pp. 272-294, 346, 431-449) (Year 2016).

* cited by examiner

*Primary Examiner* — Christopher P Domone
(74) *Attorney, Agent, or Firm* — Mintz Levin Cohn Ferris Glovsky and Popeo, P.C.; Peter F. Corless (57) ABSTRACT

A method of controlling hydrogen concentration of a fuel cell includes calculating hydrogen or nitrogen concentration of gas stored in a fuel tank; estimating hydrogen or nitrogen concentration at an anode of the fuel cell based on the calculated hydrogen or nitrogen concentration of the gas; and controlling a hydrogen supply unit based on the estimated hydrogen or nitrogen concentration at the anode such that the hydrogen or nitrogen concentration at the anode follows desired hydrogen concentration or desired nitrogen concentration.

14 Claims, 4 Drawing Sheets

CONTROL METHOD AND CONTROL SYSTEM OF HYDROGEN CONCENTRATION FOR FUEL CELL

CROSS REFERENCE TO RELATED APPLICATION

The present application claims under 35 U.S.C. § 119(a) the benefit of Korean Patent Application No. 10-2018-0029616, filed on Mar. 14, 2018, the entire contents of which are incorporated by reference herein.

BACKGROUND

1. Technical Field

The present disclosure relates to a control method and control system of hydrogen concentration for a fuel cell, and more particularly, to a method and system for estimating and controlling hydrogen concentration at an anode of a fuel cell, using hydrogen concentration of a fuel tank.

2. Description of the Related Art

A fuel cell is a device that converts chemical energy into electrical energy using an oxidation-reduction reaction of hydrogen and oxygen that are supplied from a hydrogen supply and an air supply, respectively, and includes a fuel cell stack that generates electrical energy and a cooling system that cools the fuel cell stack.

In particular, hydrogen is supplied to an anode of a fuel cell stack, and an oxidation reaction of the hydrogen occurs at the anode, so protons and electrons are produced. Further, the protons and electrons move to a cathode through an electrolyte membrane and a separator. Water is produced at the cathode by an electrochemical reaction of the protons and electrons moving from the anode and the oxygen of the air, and electrical energy is generated by flow of the electrons.

The concentration of the hydrogen that is supplied to the anode of the fuel cell stack is required to be maintained at an appropriate level, so appropriate hydrogen purge control is performed in a hydrogen recirculation line. Hydrogen purge control generally estimates hydrogen concentration in real time, so the hydrogen purge control is performed so that hydrogen concentration is maintained at an appropriate level.

In such estimation of hydrogen concentration, it is assumed that hydrogen of 100% purity is stored in a fuel tank and supplied to an anode. However, fuel tanks are provided after being filled with nitrogen due to a safety problem such as explosion in the manufacturing process. Accordingly, at the early stage of manufacturing a fuel cell vehicle equipped with a fuel cell, a fuel tank is filled with nitrogen and a hydrogen tank is repeatedly filled with hydrogen, whereby the hydrogen concentration converges on 100%.

Whether the hydrogen concentration is 100% in a fuel tank when the fuel cell is started is uncertain, so it is impossible to estimate the hydrogen concentration, and thus purge control based on ampere-counting has been used in the related art.

However, even according to the purge control not estimating hydrogen concentration, but based on ampere-counting, when hydrogen concentration is a predetermined level or less, purge control is performed based on low ampere counting value Q. According to the purge control based on ampere-counting, a large amount of hydrogen is purged, so a problem with fuel efficiency is caused, and it is difficult to satisfy the environmental standards concerning exhaust gas.

The description provided above as a related art of the present disclosure is just for helping understanding the background of the present disclosure and should not be construed as being included in the related art known by those skilled in the art.

SUMMARY

The present disclosure provides a method and system for accurately estimating hydrogen concentration at an anode of a fuel cell at an early stage of driving the fuel cell where there is low hydrogen concentration in a fuel tank, thereby controlling hydrogen concentration at the anode of the fuel cell.

In accordance with an aspect of the present disclosure, there is provided a method of controlling hydrogen concentration of a fuel cell, the method including: calculating, by a gas concentration estimator, hydrogen or nitrogen concentration of gas stored in a fuel tank; estimating, by the gas concentration estimator, hydrogen or nitrogen concentration at an anode of the fuel cell based on the calculated hydrogen or nitrogen concentration of the gas; and controlling, by a controller, a hydrogen supply unit based on the estimated hydrogen or nitrogen concentration at the anode such that the hydrogen or nitrogen concentration at the anode follows desired hydrogen concentration or desired nitrogen concentration.

The method may further include accumulatively measuring a number of times of filling the fuel tank with fuel, before the calculation of hydrogen or nitrogen concentration of gas stored in a fuel tank, in which when the measured accumulated number of times of filling is less than a predetermined number of times, the hydrogen or nitrogen concentration of the gas stored in the fuel tank may be calculated.

The method may further include accumulatively measuring the amount of fuel filled in a fuel tank before the calculation of hydrogen or nitrogen concentration of gas stored in a fuel tank, in which when the measured amount of accumulated fuel is less than a predetermined amount of fuel, the hydrogen or nitrogen concentration of the gas stored in the fuel tank may be calculated.

In the calculation of hydrogen or nitrogen concentration of gas stored in a fuel tank, the concentration of hydrogen or nitrogen may be calculated under the assumption that hydrogen and nitrogen are included in the fuel tank and only pure hydrogen is injected into the fuel tank when the fuel tank is filled with fuel.

In the calculation of hydrogen or nitrogen concentration of gas stored in a fuel tank, the hydrogen concentration after fuel-filling may be calculated, using the hydrogen concentration before fuel-filling, the filling ratio before fuel-filling, and the filling ratio after fuel-filling.

In the estimating of hydrogen or nitrogen concentration at the anode of a fuel cell, the ratio of the hydrogen amount in an entire gas amount obtained by summing the nitrogen amount, hydrogen amount, and vapor amount at the anode may be estimated.

The entire gas amount at the anode may be estimated using pressure, volume, and temperature of the entire gas at the anode.

The nitrogen amount at the anode may be estimated by adding an early nitrogen amount to a crossover amount of nitrogen, a purge amount of nitrogen, and the nitrogen amount supplied from the fuel tank that are integrated for time.

The nitrogen amount from the fuel tank integrated for time may be estimated using the calculated hydrogen or nitrogen concentration of the gas stored in the fuel tank.

The vapor amount of the anode may be estimated by adding early vapor amount to the crossover amount of vapor and the purge amount of vapor that are integrated for time.

The hydrogen amount at the anode may be estimated by subtracting the nitrogen amount and the vapor amount from the entire gas amount at the anode.

In the controlling of a hydrogen supply unit, the gas pressure at the anode may be controlled or purge for discharging the gas at the anode to the outside may be controlled, in order to change the hydrogen concentration at the anode.

In accordance with another aspect of the present disclosure, there is provided a system for controlling hydrogen concentration of a fuel cell, the system including: a fuel tank that stores hydrogen to be supplied to a fuel cell; a hydrogen supply unit that supplies the hydrogen in the fuel tank to the fuel cell; a gas concentration estimator that calculates hydrogen or nitrogen concentration of the gas stored in the fuel tank and estimates hydrogen or nitrogen concentration at the anode of the fuel cell based on the calculated hydrogen or nitrogen concentration of the gas; and a controller that controls the hydrogen supply unit based on the hydrogen or nitrogen concentration at the anode estimated by the gas concentration estimator such that the hydrogen or nitrogen concentration at the anode follows desired hydrogen concentration or desired nitrogen concentration.

The hydrogen supply unit may include a fuel ejector and a fuel supply valve that are disposed between a recirculation line for supplying the hydrogen passing through the fuel cell back to the fuel cell and a fuel supply line for supplying the hydrogen in the fuel tank to the fuel cell, and the controller may control gas pressure at the anode by controlling the fuel ejector and the fuel supply valve in order to change the hydrogen concentration at the anode.

The hydrogen supply unit may include a purge valve that is disposed in the recirculation line for supplying the gas passing through the fuel cell back to the fuel cell and discharges gas at the anode to the outside, and the controller may control purge for discharging the gas at the anode to the outside by controlling the purge valve in order to change the hydrogen concentration at the anode.

According to the method of controlling hydrogen concentration of a fuel cell, it is possible to accurately estimate the concentration of hydrogen that is supplied to a fuel cell including nitrogen in a fuel tank at the early stage of operating the fuel cell.

Further, unnecessary hydrogen purge of a fuel cell is prevented, so fuel efficiency is increased, which is advantageous in satisfying the regulations of exhaust gas.

Further, it is possible to prevent a fuel cell from being supplied with low-concentration hydrogen for operation, so it is possible to prevent acceleration of deterioration of the fuel cell and improve the durability of the fuel cell accordingly.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE
EXEMPLARY EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Embodiments described herein may be changed in various ways and various shapes, so specific embodiments are shown in the drawings and will be described in detail in this specification. However, it should be understood that the exemplary embodiments according to the concept of the present disclosure are not limited to the embodiments which will be described hereinbelow with reference to the accompanying drawings, but all of modifications, equivalents, and substitutions are included in the scope and spirit of the disclosure.

Exemplary embodiments will be described hereafter in detail with reference to the accompanying drawings. Like reference numerals given in the drawings indicate like components.

Figure 1:
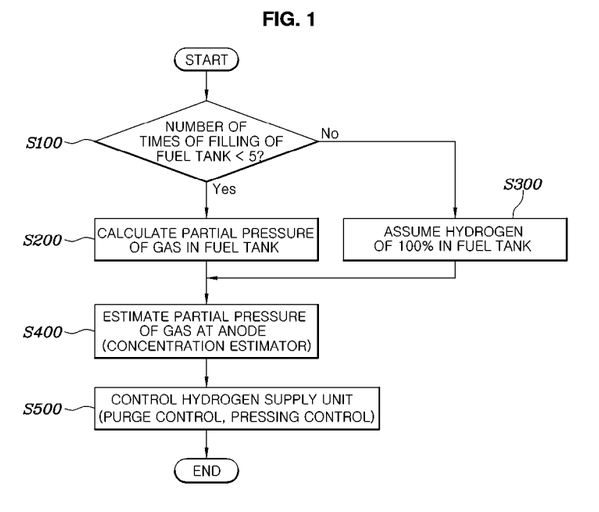
FIG. 1 is a flowchart showing a method of controlling hydrogen concentration of a fuel cell according to an embodiment.

FIG. 1 is a flowchart showing a method of controlling hydrogen concentration of a fuel cell according to an embodiment.

Referring to FIG. 1, a method of controlling hydrogen concentration of a fuel cell according to an embodiment includes: calculating hydrogen or nitrogen concentration of gas stored in a fuel tank (S200); estimating hydrogen or nitrogen concentration at an anode of the fuel cell based on the calculated hydrogen or nitrogen concentration (S400); and controlling a hydrogen supply unit based on the estimated hydrogen or nitrogen concentration such that the hydrogen or nitrogen concentration at the anode follows a desired hydrogen concentration or a desired nitrogen concentration (S500).

Accordingly, it is possible to improve accuracy in estimation of the concentration of hydrogen or nitrogen at the anode of the fuel cell by considering the concentration of hydrogen or nitrogen of the gas stored in the fuel tank, so it is possible to appropriately maintain the hydrogen concentration at the anode of the fuel cell through purge control or pressurizing control.

Figure 2:
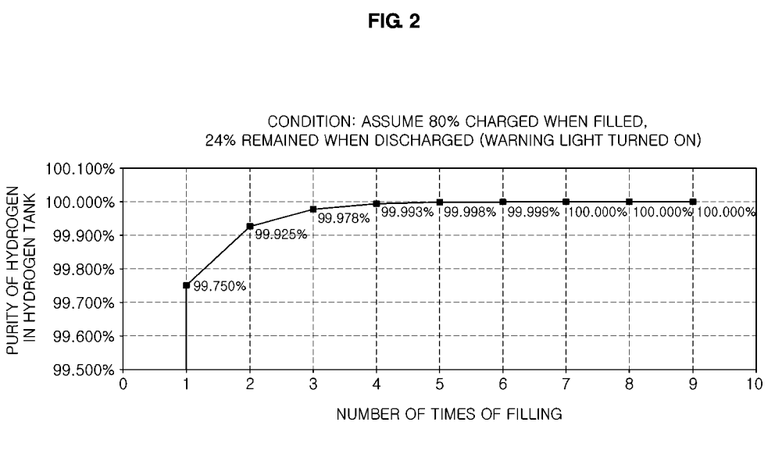
FIG. 2 is a graph showing hydrogen concentration in a fuel tank according to a number of times of injecting fuel into the fuel tank.

FIG. 2 is a graph showing hydrogen concentration in a fuel tank according to a number of times of injecting fuel into the fuel tank. In particular, it is assumed that the fuel tank is filled with hydrogen when the filling ratio of the fuel tank is 24% at which a warning light is turned on, and the fuel tank keeps being filled with hydrogen until the filling rate of the fuel tank reaches 80%.

Referring to FIG. 2, a fuel tank is filled with only nitrogen in the manufacturing process and then provided and assembled, and it can be filled with hydrogen when a fuel cell vehicle is delivered from the warehouse. The hydrogen concentration is measured as 99.730%, 99.925%, 99.993%, and 99.993% respectively at one-time, two-time, three-time, and four-time filling of the fuel tank with hydrogen. That is, the larger the number of times of filling, the more the hydrogen is mixed, so the hydrogen concentration converges on 100%.

Accordingly, when a fuel tank is repeatedly filled with hydrogen, the hydrogen concentration of the fuel tank can be assumed as 100%, but a large amount of nitrogen is included at the early stage of driving a fuel cell, so the hydrogen concentration cannot be assumed as 100%. That is, when a fuel tank is repeatedly filled with hydrogen, the hydrogen concentration in the fuel tank converges on 100%, so the hydrogen concentration in the fuel tank can be assumed as 100%, but the nitrogen in the fuel tank cannot be ignored at the early stage of driving a fuel cell.

In order to determine whether the hydrogen concentration is 100%, the method further includes accumulatively measuring a number of times of filling the fuel tank with hydrogen (S100) before the calculation of hydrogen or nitrogen concentration of gas stored in a fuel tank (S200). Accordingly, when the accumulatively measured number of times of filling is less than a predetermined number of times, the hydrogen or nitrogen concentration of the gas stored in the fuel tank can be calculated. When the accumulatively measured number of times of filling is the predetermined number of time or more, it is possible to assume that the hydrogen concentration of the gas stored in the fuel tank is 100% (S300).

That is, as shown in FIG. 2, when the number of times of filling the fuel tank with fuel is five or more times, the hydrogen concentration in the fuel tank is 99.998%, so there is little error when estimating the hydrogen concentration at the anode of a fuel cell even if the hydrogen concentration in the fuel tank is assumed as 100%. Accordingly, it is possible to set the predetermined number of times as five times and calculate hydrogen or nitrogen concentration of the gas stored in the fuel tank only when the number of times of filling is less than five times.

As another example, since the amount of hydrogen that is injected may be different every time a fuel tank is filled with fuel, the method further includes accumulatively measuring the amount of fuel filled in a fuel tank (not shown) in consideration of this fact, more accurately, before the calculation of hydrogen or nitrogen concentration of gas stored in a fuel tank (S200). Accordingly, it is possible to calculate the hydrogen or nitrogen concentration of the gas stored in the fuel tank when the measured amount of accumulated fuel is less than a predetermined amount of fuel.

In the accumulatively measuring the amount of fuel filled in a fuel tank (not shown), it is possible to measure the filled amount of hydrogen by comparing the filling ratios before and after filling when filling the fuel tank with fuel and to accumulatively measure the amount of fuel filled in the fuel tank. This is because there is less error even if the gas stored in the fuel tank is hydrogen of 100% when the measured amount of accumulated fuel is the predetermined amount of fuel or more.

Accordingly, it is possible to precisely control hydrogen concentration of a fuel cell by calculating the hydrogen concentration of the gas stored in the fuel tank only at the early stage of driving the fuel cell or at the early stage after the fuel tank is replaced, and then there is little error, so it is possible to remove unnecessary calculation and simplify the calculation process under the assumption that the gas stored in the fuel tank is hydrogen of 100%.

In the calculation of hydrogen or nitrogen concentration of gas stored in a fuel tank (S200), it is possible to calculate the hydrogen concentration or nitrogen concentration of the gas stored in the fuel tank. It can be assumed herein that only hydrogen and nitrogen exist in the fuel tank.

It was described above to control a hydrogen supply unit by calculating and estimating the concentration of hydrogen, but it may be possible in the same way to control the hydrogen supply unit by calculating and estimating the concentration of nitrogen.

In particular, in the calculation of hydrogen or nitrogen concentration of gas stored in a fuel tank, the concentration of hydrogen or nitrogen can be calculated under the assumption that hydrogen and nitrogen are included in the fuel tank and only pure hydrogen is injected into the fuel tank when the fuel tank is filled with fuel. That is, by assuming that pure hydrogen of 100% is injected when the fuel tank is filled with fuel, the principle that only the amount of hydrogen is increased without a change of the amount of nitrogen in the fuel tank can be used.

In the calculation of hydrogen or nitrogen concentration of gas stored in a fuel tank (S200), it is possible to calculate the hydrogen concentration after fuel-filling, using the hydrogen concentration before fuel-filling, the filling ratio before fuel-filling, and the filling ratio after fuel-filling. In particular, it is possible to calculate the hydrogen concentration in the fuel tank using the following equation.

$$x_{Tank,k}=(SOF_{k-1}-SOF_k(1-x_{Tank,k-1}))/SOF_k$$

where $X_{Tank,k}$ is the hydrogen concentration after k-number times of fuel-filling, $X_{Tank,k-1}$ is the hydrogen concentration after (k−1)-number times of fuel-filling, $SOF_k$ is the filling ratio after (k-th) $SOF_{k-1}$ is the filling ratio before (k-th) fuel-filling, and the filling ratio (SOF) is $SOF=n_{tank\_cur}/n_{tank\_max}$, Further, k is the accumulated number of times of filling of the fuel tank. In particular, the filling ratio (SOF) is the ratio of the current amount of gas (mol) stored in the fuel tank to the maximum amount of gas (mol) that can be stored in the fuel tank.

Since only pure hydrogen is injected when fuel is supplied, the equation uses the principle that the amount of nitrogen (mol) in the gas in the fuel tank is maintained at the same level before and after filling. According to this principle, the equation can be induced using that the nitrogen concentration is 1-hydrogen concentration based on the fact that filling ratio (SOF)×nitrogen concentration is constant before and after filling.

Accordingly, it is possible to calculate the hydrogen concentration after fuel-filling, using the hydrogen concentration before fuel-filling, the filling ratio before fuel-filling, and the filling ratio after fuel-filling. The hydrogen concentration before fuel-filling may be a value accumulatively calculated and stored at every fuel-filling. As for the filling ratio, the ratio of the amount of filled gas and the maximum amount of gas that can be filled can be calculated as the filling ratio, for example, by calculating the amount of gas filled in a fuel tank with a pressure sensor that measures the pressure in the fuel tank.

Since it is assumed that hydrogen and nitrogen exist with the same concentration in the fuel tank, it is assumed that gas with the same hydrogen concentration or nitrogen concentration as that in the fuel tank is supplied when hydrogen is supplied to the anode of a fuel cell from the fuel tank.

In the estimating of hydrogen or nitrogen concentration at the anode of a fuel cell (S400), it is possible to estimate the ratio of the hydrogen amount in the entire gas amount $n_{An}$ obtained by summing the nitrogen amount $n_{N2}$, hydrogen amount $n_{H2}$, and vapor amount $n_{A1}$, at the anode. That is, it is assumed that only nitrogen, hydrogen, and vapor exist at the anode of the fuel cell, and the nitrogen, hydrogen, and vapor are mixed at the same concentration throughout the anode.

In particular, the entire gas amount $n_{An}$ at the anode can be estimated using the pressure P, volume V, and temperature T of the entire gas at the anode, as in the following equation.

$$n_{An}=(P_{An} \cdot V_{An})/RT [mol]$$

where R is a gas constant, 8.314 [J/mol/K].

The nitrogen amount $n_{N2}$ at the anode can be estimated by adding the early nitrogen amount $n_{N2\_init}$ to a crossover amount of nitrogen, a purge amount of nitrogen, and the nitrogen amount supplied from the fuel tank that are integrated for time as in the following equation.

$$n_{N2}=n_{N2\_init}+\int(\dot{n}_{N2\_xo}-\dot{n}_{N2\_Pug}+\dot{n}_{N2\_tank})dt$$

where the crossover moving rate $\dot{n}_{N2\_xo}$ of nitrogen, the purge moving rate $\dot{n}_{N2\_Pug}$ of nitrogen, and the moving rate $\dot{n}_{N2\_tank}$ of nitrogen supplied from the fuel tank are the moving amounts of a substance for time, so it is possible to estimate the total moving amount of nitrogen through integration for time and to estimate the nitrogen amount $n_{N2}$ at the anode by adding the early nitrogen amount $n_{N2\_init}$ to the total moving amount.

The purge amount of nitrogen integrated for time can be estimated by integrating the crossover moving amount $\dot{n}_{N2\_xo}$ of nitrogen for time. The crossover moving rate $\dot{n}_{N2\_xo}$ of nitrogen can be estimated based on a diffusion equation.

That is, the crossover amount of nitrogen moving from the cathode to the anode of the fuel cell through a Membrane-Electrode Assembly (MEA) can be estimated by integrating the crossover moving rate within a predetermined period for time through the following equation. For example, the following equation can be used as the diffusion equation.

$$\dot{n}_{N2\_xo}=(D_{N2}/RD \cdot ((P_{ca,N2}-P_{An,N2})/\delta) \cdot A$$

The symbols in this equation are as follows.

$\dot{n}_{N2\_xo}$: crossover moving rate of nitrogen, P: pressure, [kPa], R: gas constant, 8.314 [J/mol/K], T: temperature, [K], D: diffusion coefficient, A: catalyst area, $\delta$: diffusion distance, $P_{ca,N2}$: partial pressure of nitrogen at the cathode of a fuel cell, $P_{An,N2}$: partial pressure of nitrogen at the anode of a fuel cell The diffusion coefficient D may be a parameter that is tuned at the early stage or may be a parameter that is changed in accordance with the degree of deterioration of the MEA.

The purge amount of nitrogen integrated for time can be calculated from the gas amount discharged to the outside by a purge valve that is disposed in a recirculation line for supplying the gas passing through the fuel cell of the hydrogen supply unit back to the fuel cell and discharges gas at the anode to the outside.

That is, the purge moving rate $\dot{n}_{N2\_Pug}$ of the nitrogen can be calculated by calculating the moving rate of gas discharged to the outside from the anode of the fuel cell by the purge valve and using the nitrogen concentration in the discharge gas. The gas amount discharged to the outside can be calculated using the difference between the external gas pressure and the gas pressure at the anode and the degree of opening of the purge valve, and the nitrogen concentration in the discharged gas can be assumed as being the same as the estimated nitrogen concentration at the anode.

The moving rate $\dot{n}_{N2\_tank}$ of nitrogen supplied from the fuel tank can be estimated using the calculated hydrogen or nitrogen concentration of the gas stored in the fuel tank. In particular, as in the following equation, the moving rate $\dot{n}_{N2\_tank}$ of nitrogen supplied from the fuel tank can be expressed by the hydrogen concentration $x_{tank,k}$ of the gas stored in the fuel tank and the moving rate $\dot{n}_{H2\_tank}$ of the hydrogen supplied from the fuel tank.

$$\dot{n}_{N2\_tank}=(1-x_{tank,k})/x_{tank,k}) \cdot \dot{n}_{H2\_tank}$$

As in the following equation, the rate consumed at or discharged outside from the anode of the fuel cell can be calculated and the moving rate $\dot{n}_{H2\_tank}$ of hydrogen supplied from the fuel tank can be assumed as being the same as the rate consumed at or discharged from the anode of the fuel cell.

$$\tilde{n}_{H2\_tank}=(\dot{n}_{H2\_react}+\dot{n}_{H2\_xo}+\dot{n}_{H2\_Pug})$$

Further, the moving rate $\dot{n}_{H2\_tank}$ of hydrogen supplied from the fuel tank can be obtained by measuring the moving rate of the entire gas flowing to the anode from the fuel tank using a sensor or by indirectly measuring the moving rate of the entire gas flowing from the fuel tank to the anode from the change of the gas amount stored in the fuel tank.

The vapor amount $n_V$ at the anode can be estimated by adding the early vapor amount to the crossover amount and purge amount of vapor integrated for time, as in the following equation.

$$n_V = n_{V\_init} + \int (ń_{v\_xo} - ń_{v\_Pug}) dt$$

Similar to the crossover of nitrogen, it can be assumed that the vapor moves from the cathode to the anode of the fuel cell and the crossover amount $ń_{v\_xo}$ of vapor can be estimated through the following equation.

$$ń_{v\_xo} = (D_V/RT) \cdot ((P_{Ca,V} - P_{An,V})/\delta) \cdot A$$

where $ń_{v\_xo}$: crossover speed of vapor, P: pressure, [kPa], R: gas constant, 8.314 [J/mol/K], T: temperature, [K], D: diffusion coefficient, A: catalyst area, $\delta$: diffusion distance, $P_{Ca,V}$: partial pressure of vapor at the cathode of a fuel cell, $P_{An,V}$: partial pressure of vapor at the anode of a fuel cell.

The purge amount of vapor can be calculated from the gas amount discharged to the outside by a purge valve that is disposed in a recirculation line for supplying the gas passing through the fuel cell of the hydrogen supply unit back to the fuel cell and discharges gas at the anode to the outside.

That is, it is possible to calculate the gas amount discharged outside from the anode of the fuel cell by the purge valve and calculate the purge amount $ń_{v\_Pug}$ of vapor using the vapor concentration (mol fraction of vapor) in the discharged gas.

The partial pressure $P_{Ca,v}$ of vapor at the cathode of a fuel cell, partial pressure $P_{An,V}$ of vapor at the anode of a fuel cell, and the mol fraction of vapor at the anode of a fuel cell may be values that are changed by temperature, pressure, etc. in the fuel cell, and saturated vapor pressure may be used by simply assuming saturation. However, more accurately, it is possible to calculate partial pressure of vapor or mol fraction of vapor according to states, using a map in which the partial pressure of vapor or the mol fraction of vapor according to the temperature and pressure in the fuel cell has been mapped as experimental data.

Further, the early nitrogen amount $n_{N2\_init}$ or the early vapor amount $m_{v\_init}$ can be calculated from the map using state information (pressure, temperature etc.) and stop time when the fuel cell is restarted.

The hydrogen amount $n_{H2}$ at the anode can be estimated by subtracting the nitrogen amount $n_{N2}$ and the vapor amount $n_V$ from the entire gas amount $n_{An}$ at the anode. The hydrogen amount $n_{H2}$ at the anode may also be estimated, similar to the nitrogen amount $n_{N2}$ or the vapor amount $n_{1'}$, from the early value, the crossover amount, the hydrogen amount supplied from the fuel tank, and the purge amount etc., but can be estimated by subtracting the estimated nitrogen amount $n_{N2}$ and vapor amount $n_{1'}$ from the entire gas amount $n_{An}$ at the anode.

Accordingly, the calculation process can be simplified, and particularly, the error due to estimation of the nitrogen amount $n_{N2}$ and vapor amount $n_V$ can be removed, so it is possible to stably and strongly control the hydrogen supply unit.

In the controlling of a hydrogen supply unit (S500), it is possible to control the gas pressure at the anode or control purge for discharging the gas at the anode to the outside in order to change the hydrogen concentration at the anode.

Figure 3:
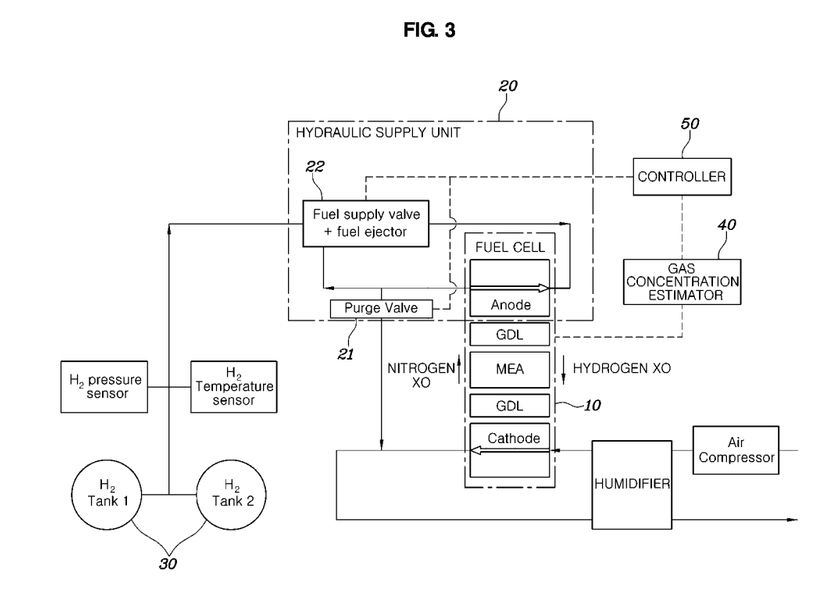
FIG. 3 is diagram showing the configuration of a system for controlling hydrogen concentration of a fuel cell according to an embodiment.

FIG. 3 is diagram showing the configuration of a system for controlling hydrogen concentration of a fuel cell according to an embodiment.

Referring to FIG. 3, a system for controlling hydrogen concentration of a fuel cell according to an embodiment may include: a fuel tank 30 that stores hydrogen to be supplied to a fuel cell 10; a hydrogen supply unit 20 that supplies the hydrogen in the fuel tank 30 to the fuel cell 10; a gas concentration estimator 40 that calculates hydrogen or nitrogen concentration of the gas stored in the fuel tank 30 and estimates hydrogen or nitrogen concentration at the anode of the fuel cell 10 based on the calculated hydrogen or nitrogen concentration; and a controller 50 that controls the hydrogen supply unit 20 based on the hydrogen or nitrogen concentration at the anode estimated by the gas concentration estimator 40 such that the hydrogen or nitrogen concentration at the anode follows desired hydrogen concentration or desired nitrogen concentration.

The hydrogen supply unit 20 may include: a recirculation line for supplying the hydrogen passing through the fuel cell 10 back to the fuel cell 10; and a fuel supply line for supplying the hydrogen in the fuel tank 30 to the fuel cell 10 together with the gas in the recirculation line.

The hydrogen supply unit further includes a fuel ejector and a fuel supply valve 22 that are disposed between the recirculation line for supplying the hydrogen passing through the fuel cell 10 back to the fuel cell 10 and the fuel supply line for supplying the hydrogen in the fuel tank 30 to the fuel cell 10, and the controller 50 may control the gas pressure at the anode by controlling the fuel ejector and the fuel supply valve 22 in order to change the hydrogen concentration at the anode.

Alternatively, the hydrogen supply unit 20 may include a purge valve 21 that is disposed in the recirculation line for supplying the gas passing through the fuel cell 10 back to the fuel cell 10 and discharges gas at the anode to the outside, and the controller 50 may control purge for discharging the gas at the anode to the outside by controlling the purge valve 21 in order to change the hydrogen concentration at the anode.

The gas concentration estimator 40, as described above, can calculate hydrogen or nitrogen concentration of the gas stored in the fuel tank 30 and can estimate the hydrogen concentration or nitrogen concentration at the anode of the fuel cell 10 based on the calculated hydrogen or nitrogen concentration of the gas stored in the fuel tank 30.

The controller 50 can map and store the optimum hydrogen concentration for the output current of the fuel cell 10 and can control the hydrogen concentration at the anode of the fuel cell 10 at the optimum hydrogen concentration for the output current of the fuel cell 10. When the hydrogen concentration at the anode of the fuel cell 10 is high, the crossover amount of the hydrogen is increased, so the fuel efficiency is deteriorated. Further, when the hydrogen concentration at the anode of the fuel cell 10 is low, the hydrogen is not enough for a reaction, so the lifespan of the stack of the fuel cell 10 is reduced. The optimum hydrogen concentration is determined in consideration of all of these situations, the upper limit and the lower limit of the optimum concentration can be mapped, and the hydrogen concentration at the anode of the fuel cell 10 can be controlled within the range between the upper and lower limits.

The controller 50 can use closed-loop control through feedback control such that the hydrogen or nitrogen concentration at the anode of the fuel cell 10 estimated by the gas concentration estimator 40 follows the desired hydrogen concentration or the desired nitrogen concentration. Accordingly, if the hydrogen concentration estimated by the gas concentration estimator 40 is accurate, hydrogen concentration purge can be stably performed even against external disturbance.

In general, in order to control the hydrogen concentration at the anode, it is possible to control the purge valve 21 disposed in the recirculation line for the fuel cell 10 and discharging the gas at the anode to the outside while the fuel cell 10 is operated. For example, it is possible to use a method of opening the purge valve 21 when the hydrogen concentration at the anode of the fuel cell 10 estimated by the gas concentration estimator 40 reaches the lower limit of the optimum hydrogen concentration while the fuel cell 10 is operated, and of closing the purge valve 21 when the hydrogen concentration at the anode of the fuel cell 10 reaches the upper limit of the optimum hydrogen concentration.

Accordingly, it is possible to immediately control the hydrogen concentration at the anode of the fuel cell 10 by opening and closing the purge valve 21.

Further, the controller 50 can control the fuel ejector and the fuel supply valve 22 that are disposed between the recirculation line for supplying the hydrogen passing through the fuel cell 10 back to the fuel cell 10 and the fuel supply line for supplying the hydrogen in the fuel tank 30 to the fuel cell 10, in order to change the hydrogen concentration at the anode.

When the system of the fuel cell 10 is restarted after stopped or when the fuel cell 10 is restarted after stopping power generation (FC stop) while a vehicle is driven, the hydrogen concentration at the anode of the fuel cell 10 may be rapidly decreased, so it is possible to rapidly increase the hydrogen concentration at the anode of the fuel cell 10 by increasing the gas pressure at the anode of the fuel cell 10. That is, it is possible to increase the gas pressure at the anode of the fuel cell 10 by increasing the hydrogen amount in the fuel tank 30 to be supplied to the fuel cell 10 by controlling the fuel ejector and the fuel supply valve 22.

Further, the hydrogen supply unit 20 can also be controlled in other ways to change the hydrogen concentration at the anode.

Figure 4:
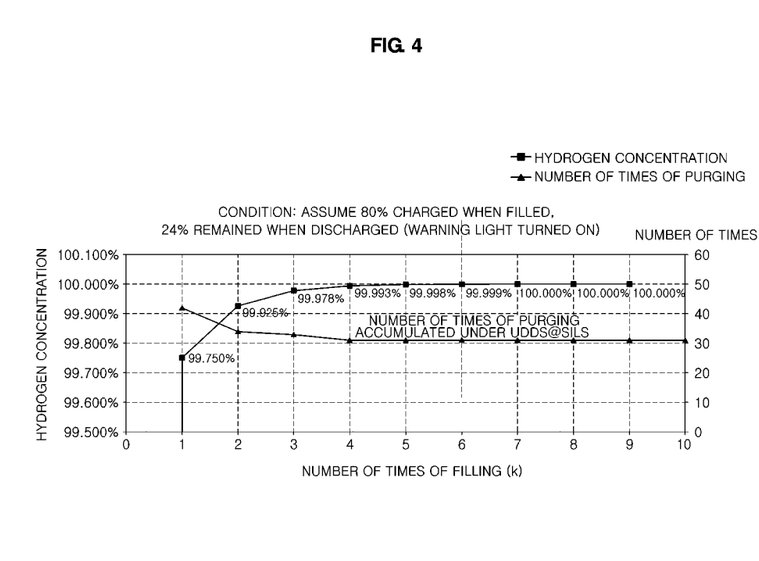
FIG. 4 is a diagram showing a number of times of purging according to the number of times of injecting fuel into the fuel tank when the method and system for controlling hydrogen concentration of the fuel cell of the present disclosure are applied.

FIG. 4 is a diagram showing the number of time of purging according to the number of time of injecting fuel into a fuel tank when the method and system for controlling hydrogen concentration of a fuel cell of the present disclosure is applied.

Referring to FIG. 4, according to the present disclosure, it can be seen that a number of times of purging is accumulated about thirty one times when the number of times of filling of a fuel tank is five times or more, and that the number of times of purging converges about thirty one times with an increase in the number of times of filling from about forty two times of purging when the number of times of filling of a fuel tank is less than five times.

That is, it can be seen that the higher the hydrogen concentration in the fuel tank, the less than the accumulated value of the number of times of purging, and this tendency agrees with the experiential acknowledge, so purging is appropriately controlled. Accordingly, it can be seen that unnecessary hydrogen purging of a fuel cell is prevented, so fuel efficiency is increased, which is advantageous in satisfying the regulations of exhaust gas.

Although the present disclosure was provided above in relation to specific embodiments shown in the drawings, it is apparent to those skilled in the art that the present disclosure may be changed and modified in various ways without departing from the scope of the present disclosure, which is described in the following claims.

What is claimed is:

1. A method of controlling hydrogen concentration of a fuel cell, the method comprising:
    calculating, by a gas concentration estimator, hydrogen or nitrogen concentration of gas stored in a fuel tank;
    estimating, by the gas concentration estimator, hydrogen or nitrogen concentration at an anode of the fuel cell based on the calculated hydrogen or nitrogen concentration of the gas;
    controlling, by a controller, a hydrogen supply unit based on the estimated hydrogen or nitrogen concentration at the anode such that the hydrogen or nitrogen concentration at the anode follows desired hydrogen concentration or desired nitrogen concentration;
    accumulatively measuring a number of times of filling the fuel tank with fuel before the calculation of hydrogen or nitrogen concentration of gas stored in the fuel tank,
    wherein when the measured accumulated number of times of filling is less than a predetermined number of times, the hydrogen or nitrogen concentration of the gas stored in the fuel tank is calculated.

2. The method of claim 1, further comprising accumulatively measuring the amount of fuel filled in the fuel tank before the calculation of hydrogen or nitrogen concentration of gas stored in the fuel tank,
    wherein when the measured amount of accumulated fuel is less than a predetermined amount of fuel, the hydrogen or nitrogen concentration of the gas stored in the fuel tank is calculated.

3. The method of claim 1, wherein, in the calculation of hydrogen or nitrogen concentration of gas stored in the fuel tank, the concentration of hydrogen or nitrogen is calculated under the assumption that hydrogen and nitrogen are included in the fuel tank and only pure hydrogen is injected into the fuel tank when the fuel tank is filled with fuel.

4. The method of claim 3, wherein in the calculation of hydrogen or nitrogen concentration of gas stored in the fuel tank, the hydrogen concentration after fuel-filling is a calculated, using the hydrogen concentration before fuel-filling, filling ratio before fuel-filling, and filling ratio after fuel-filling.

5. The method of claim 1, wherein in the estimating of hydrogen or nitrogen concentration at the anode of the fuel cell, the ratio of the hydrogen amount in an entire gas amount obtained by summing the nitrogen amount, hydrogen amount, and vapor amount at the anode is estimated.

6. The method of claim 5, wherein the entire gas amount at the anode is estimated using pressure, volume, and temperature of the entire gas at the anode.

7. The method of claim 5, wherein the nitrogen amount at the anode is estimated by adding a nitrogen amount filled in a fuel tank in a manufacturing process to a crossover amount of nitrogen, a purge amount of nitrogen, and the nitrogen amount supplied from the fuel tank that are integrated for time.

8. The method of claim 7, wherein the nitrogen amount from the fuel tank integrated for time is estimated using the calculated hydrogen or nitrogen concentration of the gas stored in the fuel tank.

9. The method of claim 5, wherein the vapor amount of the anode is estimated by adding vapor amount when the fuel cell is restarted to the crossover amount of vapor and the purge amount of vapor that are integrated for time.

10. The method of claim 5, wherein the hydrogen amount at the anode is estimated by subtracting the nitrogen amount and the vapor amount from the entire gas amount at the anode.

11. The method of claim 1, wherein in the controlling of a hydrogen supply unit, the gas pressure at the anode is controlled or purge for discharging the gas at the anode to the outside is controlled, in order to change the hydrogen concentration at the anode.

12. A system for controlling hydrogen concentration of a fuel cell, the system comprising:
- a fuel tank that stores hydrogen to be supplied to the fuel cell;
- a hydrogen supply unit that supplies the hydrogen in the fuel tank to the fuel cell;
- a gas concentration estimator that calculates hydrogen or nitrogen concentration of the gas stored in the fuel tank and estimates hydrogen or nitrogen concentration at the anode of the fuel cell based on the calculated hydrogen or nitrogen concentration of the gas; and
- a controller that controls the hydrogen supply unit based on the hydrogen or nitrogen concentration at the anode estimated by the gas concentration estimator such that the hydrogen or nitrogen concentration at the anode follows desired hydrogen concentration or desired nitrogen concentration,
- wherein the gas concentration estimator accumulatively measures a number of times of filling the fuel tank with fuel before the calculation of hydrogen or nitrogen concentration of gas stored in the fuel tank,
- wherein when the measured accumulated number of times of filling is less than a predetermined number of times, the hydrogen or nitrogen concentration of the gas stored in the fuel tank is calculated.

13. The system of claim 12, wherein the hydrogen supply unit includes a fuel ejector and a fuel supply valve that are disposed between a recirculation line for supplying the hydrogen passing through the fuel cell back to the fuel cell and a fuel supply line for supplying the hydrogen in the fuel tank to the fuel cell, and
- the controller controls gas pressure at the anode by controlling the fuel ejector and the fuel supply valve in order to change the hydrogen concentration at the anode.

14. The system of claim 12, wherein the hydrogen supply unit includes a purge valve that is disposed in the recirculation line for supplying the gas passing through the fuel cell back to the fuel cell and discharges gas at the anode to the outside, and
- the controller controls purge for discharging the gas at the anode to the outside by controlling the purge valve in order to change the hydrogen concentration at the anode.

* * * * *